United States Patent
Chen et al.

(10) Patent No.: US 9,718,733 B2
(45) Date of Patent: Aug. 1, 2017

(54) AMPHOTERIC BETAINE-TYPE POLYCARBOXYLATE SUPERPLASTICIZER AND PREPARATION METHOD THEREOF

(71) Applicant: SHENZHEN UNIVERSITY, Shenzhen, Guangdong (CN)

(72) Inventors: Shaojun Chen, Guangdong (CN); Shiguo Chen, Guangdong (CN); Zaochuan Ge, Guangdong (CN); Chengbin Chen, Guangdong (CN); Lidan Gu, Guangdong (CN)

(73) Assignee: SHENZHEN UNIVERSITY, Shenzhen (CN)

(*) Notice: Subject to any disclaimer, the term of this patent is extended or adjusted under 35 U.S.C. 154(b) by 0 days.

(21) Appl. No.: 15/063,531

(22) Filed: Mar. 8, 2016

(65) Prior Publication Data
US 2016/0185663 A1   Jun. 30, 2016

Related U.S. Application Data

(63) Continuation of application No. PCT/CN2014/091013, filed on Nov. 13, 2014.

(30) Foreign Application Priority Data

Mar. 18, 2014 (CN) .......................... 2014 1 0101519

(51) Int. Cl.
| | | |
|---|---|---|
| *C08F 220/38* | (2006.01) | |
| *C04B 24/26* | (2006.01) | |
| *C04B 28/02* | (2006.01) | |
| *C08F 220/08* | (2006.01) | |
| *C04B 24/16* | (2006.01) | |
| *C08F 290/06* | (2006.01) | |
| *C08F 216/14* | (2006.01) | |
| *C04B 103/32* | (2006.01) | |

(52) U.S. Cl.
CPC ........ *C04B 24/165* (2013.01); *C04B 24/2647* (2013.01); *C04B 28/02* (2013.01); *C08F 216/1416* (2013.01); *C08F 220/08* (2013.01); *C08F 220/38* (2013.01); *C08F 290/062* (2013.01); *C04B 2103/32* (2013.01); *C08F 2216/1433* (2013.01)

(58) Field of Classification Search
CPC ... C04B 24/165; C04B 24/2647; C04B 28/02; C04B 2103/32; C08F 220/38; C08F 220/08; C08F 290/062; C08F 216/1416; C08F 2216/1433
USPC ...................................... 526/317.1
See application file for complete search history.

(56) References Cited

FOREIGN PATENT DOCUMENTS

| CN | 101538352 A | * | 9/2009 |
|---|---|---|---|
| CN | 102453194 A | | 5/2012 |
| CN | 102617065 A | * | 8/2012 |
| CN | 102443177 B | | 3/2013 |
| CN | 102627744 B | | 6/2013 |
| CN | 103253886 A | * | 8/2013 |

OTHER PUBLICATIONS

1st Office Action of counterpart Chinese Patent Application No. 201410101519.9 issued on Oct. 26, 2015.

* cited by examiner

*Primary Examiner* — Michael M Bernshteyn

(57) ABSTRACT

An amphoteric betaine-type polycarboxylic acid water reducer and a preparation method therefor are provided in the present invention. An unsaturated betaine-type monomer A and an acrylic acid-type polyethylene glycol monomer B are placed in a reaction container, stirred until uniform and then an acrylic acid-type monomer C is added, the stirring is continued and water is added to make adjustments so as to make the total mass of the monomers account for 10%-20% of the total mass of the aqueous solution; and under the protection of an inert gas, the temperature is raised to 60° C.-100° C., an aqueous initiator solution is added, maintaining the temperature and reacting for 4-6 h, and after the reaction is completed, the solution is cooled to room temperature, and the pH value thereof is adjusted to 5-7 to prepare the amphoteric betaine-type polycarboxylic acid water reducer.

7 Claims, No Drawings

AMPHOTERIC BETAINE-TYPE POLYCARBOXYLATE SUPERPLASTICIZER AND PREPARATION METHOD THEREOF

CROSS REFERENCE TO RELATED APPLICATIONS

The present application is a Continuation application of PCT application No. PCT/CN2014/091013 filed on Nov. 13, 2014, which claims the benefit of Chinese patent application No. 201410101519.9 filed on Mar. 18, 2014. All the above are hereby incorporated by reference.

TECHNICAL FIELD

The present invention relates to the technical field of concrete superplasticizers, and more particularly to an amphoteric betaine-type polycarboxylate superplasticizer and a preparation method thereof.

BACKGROUND

With the continuous development of construction industry and science and technology, concretes become increasingly widely used, and thus increasingly higher requirements are imposed on the technical performance of the concretes. In practice, use of additives is confirmed to be a major way to advance the concrete technology, because with them, the concrete is adapted to meet various construction requirements, and has the advantages of low investment, quick action, convenient generalization for use, notable technical and economical benefits, and others. Superplasticizer is one of the most important concrete additives.

In recent years, high performance and pollution free are development tendency in research and production of concretesuperplasticizers. For example, maleic anhydride-based and acrylic high-performance concretesuperplasticizers are widely used in hydraulic and road engineering requiring durable concretes in America, Japan, Italia and other countries. Although the technology is mature, the process is complex and the reaction condition is harsh, which are unfavorable for generalization.

The research on high-performance superplasticizer has progressed to the 3$^{rd}$ generation of polycarboxylate superplasticizers, which are further subdivided into four classes, that is, copolymers of vinyl monomers, propylene oxide copolymers, polyamide/polyimide type copolymers, and amphoteric vinyl polymers. The amphoteric vinyl polymer superplasticizer is a class of highly effective superplasticizer which exhibits the highest performance in the 3$^{rd}$ generation of high-potent superplasticizers.

Betaine-type amphoteric monomers are a class of functional monomers that are widely used hitherto, which generally have a polymerizable alkenyl moiety and a betaine pendant moiety with electrically neutral amphoteric feature in their structure, and are of a carboxylic betaine type and a sulfonic betaine type. Amphoteric polymers having a net charge of 0 and anti-polyelectrolyte solution behaviors may be obtained from homopolymerization or copolymerization of these betaine-type amphoteric monomers alone or with other neutral monomers under certain conditions. These amphoteric polymers arouse great interest due to the high chemical and thermal stability, high hydration capacity, and the inclusion of equal number of quaternary ammonium cations and sulfonate anions that are insusceptible to the pH of the solution.

Patents CN101538352A, CN102627744B, and CN102443177B successively disclose a method for preparing an amphoteric polymeric superplasticizer, mainly through copolymerization of two cationic monomers. However, the process is complex. At present, there is no amphoteric polycarboxylate superplasticizer based on betaine monomers disclosed.

SUMMARY OF THE INVENTION

In light of the above technical problems, the present invention provides an amphoteric betaine-type polycarboxylate superplasticizer and a preparation method thereof, so as to overcome the defect in the prior art that there is no betaine-type amphoteric polycarboxylate superplasticizer.

The present invention employs the following technical solution. An amphoteric betaine-type polycarboxylate superplasticizer is provided, which is obtained through aqueous solution polymerization of a monomer A, a monomer B and a monomer C at a weight ratio of (1-30%):(20-50%):(20-50%) in the presence of an initiator;

where the monomer A has a general formula of

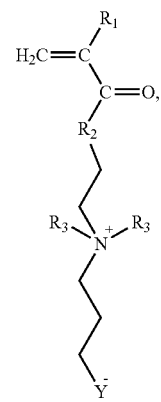

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;

the monomer B has a general formula of

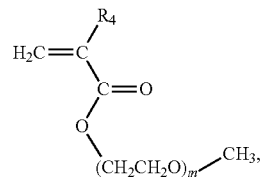

in which $R_4$ is H or $CH_3$, and m is the average addition moles of oxyethylene and is an integer selected from 1-100; and the monomer C has a general formula of

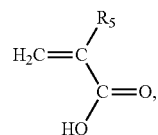

in which $R_5$ is H or $CH_3$.

The present invention further provides a method for preparing an amphoteric betaine-type polycarboxylate superplasticizer, comprising:

placing a monomer A and a monomer B in a reaction vessel, adding water, and stirring;

then adding a monomer C to the reaction vessel, stirring, and adding water to adjust in such a manner that the total weight of the monomers accounts for 10-20% of the total weight of the aqueous solution, in which the weight ratio of the monomer A, the monomer B, and the monomer C is (1-30%):(20-50%):(20-50%);

under an inert atmosphere, adding an initiator when the temperature is raised to 60-100° C.; and reacting for 4-6 hrs with thermal insulation, and after the reaction is complete, adjusting the pH to 5-7, to obtain an aqueous solution of the amphoteric betaine-type polycarboxylate superplasticizer;

where the monomer A has a general formula of

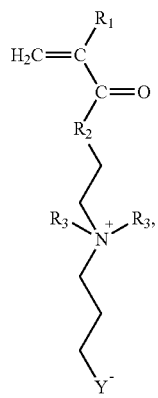

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;

the monomer B has a general formula of

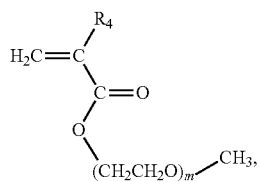

in which $R_4$ is H or $CH_3$, and m is the average addition moles of oxyethylene and is an integer selected from 1-100; and the monomer C has a general formula of

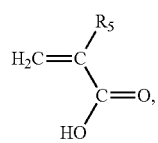

in which $R_5$ is H or $CH_3$.

The method for preparing an amphoteric betaine-type polycarboxylate superplasticizer according to the present invention is simple in reaction process, environmentally friendly and free of contaminations. The prepared betaine-type polycarboxylate superplasticizer has an amphoteric structure and a strong dispersibility for concretes. The reaction system is free of $Cl^-$ ions, thus causing no corrosion to construction materials. The superplasticizer is widely applicable to production of high-performance concretes, recycled concretes, moisture-retention concretes, ceramic products, and brick and tile products for enhancing the fluidity, reducing the water consumption, and lowering the energy consumption.

DETAILED DESCRIPTION

To make the technical problem, technical solution and beneficial effects of the present invention more clear, the present invention is described in further detail with reference to examples below. It should be understood that the specific examples described herein is merely provided for illustrating, instead of limiting, the present invention.

An embodiment of the present invention provides an amphoteric betaine-type polycarboxylate superplasticizer, which is obtained through aqueous solution polymerization of a monomer A, a monomer B and a monomer C at a weight ratio of (1-30%):(20-50%):(20-50%) in the presence of an initiator;

where the monomer A has a general formula of

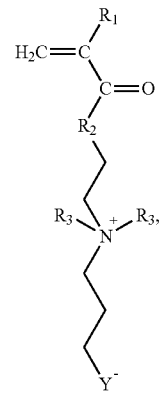

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;

the monomer B has a general formula of

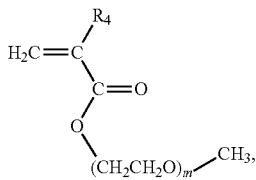

in which $R_4$ is H or $CH_3$, and m is the average addition moles of oxyethylene and is an integer selected from 1-100; and the monomer C has a general formula of

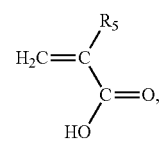

in which $R_5$ is H or $CH_3$.

An embodiment of the present invention further provides a method for preparing an amphoteric betaine-type polycarboxylate superplasticizer, comprising:
(1) placing a monomer A and a monomer B in a reaction vessel, adding water, and stirring;
(2) then adding a monomer C to the reaction vessel, stirring, and adding water to adjust in such a manner that the total weight of the monomers accounts for 10-20% of the total weight of the aqueous solution, in which the weight ratio of the monomer A, the monomer B, and the monomer C is (1-30%):(20-50%):(20-50%);
(3) under an inert atmosphere, adding an initiator when the temperature is raised to 60-100° C.; and
(4) reacting for 4-6 hrs with thermal insulation, and after the reaction is complete, adjusting the pH to 5-7, to obtain an aqueous solution of the amphoteric betaine-type polycarboxylate superplasticizer;
where the monomer A has a general formula of

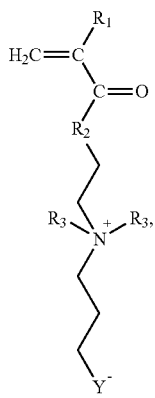

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;
the monomer B has a general formula of

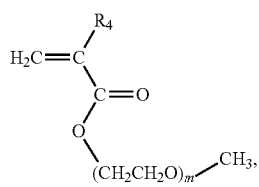

in which $R_4$ is H or $CH_3$, and m is the average addition moles of oxyethylene and is an integer selected from 1-100; and
the monomer C has a general formula of

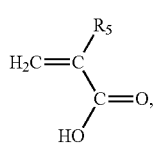

in which $R_5$ is H or $CH_3$.

In Step (1), adding water and stirring are preferably done by adding deionized water and then stirring to uniformity, followed by addition of the monomer C as described in Step (2), in which the weight percentages of the three monomers are 1-30%, 20-50%, and 20-50% respectively. After the three monomers are uniformly mixed, deionized water is added to adjust in such a manner that the total weight of the three monomers accounts for 10-20% of the total weight of the aqueous solution.

In Step (3), the aqueous initiator solution is required to be added under an inert (nitrogen) atmosphere when the temperature is raised to 60-100° C. while stirring. The initiator is a water soluble free radical initiator, and preferably ammonium persulfate, potassium persulphate, or a redox initiator. The initiator is used in an amount of 0.5-2% of the total weight of the monomers. The initiator is slowly added batchwise and preferably in three batches, such that ⅓ of the total weight of the initiator is added dropwise per hour.

In Step (4), after the addition of the initiator is complete, the reaction is continued for 4-6 hrs with thermal insulation by maintaining the temperature constant. After the reaction is complete, the reaction solution is cooled to room temperature, and then adjusted to pH5-7 at room temperature, by adding preferably 1-3 mol/L and more preferably 3 mol/L of a basic aqueous NaOH solution. The prepared aqueous superplasticizer solution was adjusted to have a weight percentage of 10-30%.

The method for preparing an amphoteric betaine-type polycarboxylate superplasticizer according to the present invention is simple in reaction process, environmentally friendly and free of contaminations. The prepared betaine-type polycarboxylate superplasticizer has an amphoteric structure and a strong dispersibility for concretes. The reaction system is free of $Cl^-$ ions, thus causing no corrosion to construction materials. The superplasticizer has a stable performance, a high water reducing rate, a high adaptability to cements, and a good compounding effect, thus being widely used in production of high-performance concretes, recycled concretes, moisture-retention concretes, ceramic products, and brick and tile products for enhancing the fluidity, reducing the water consumption, and lowering the energy consumption.

EXAMPLE 1

10 g of methyl allyl polyoxyethylene ether with a molecular weight of 1000(MPEG1000), and 2 g of N,N-dimethyl (methacryloyloxyethyl)ammonium propanesulfonate (DM-PAS) were fed to a reaction vessel containing 100 g of distilled water, heated, and stirred to uniformity. Then, 5 g of acrylic acid (AA) was added. When the temperature of the water bath was raised to 75° C. while stirring, a first 0.05 g of ammonium persulfate was added, and reacted for 1 h; then an additional 0.05 g of ammonium persulfate was added, and reacted for another 1 h; and subsequently, a last 0.05 g of ammonium persulfate was added. After reaction with thermal insulation for 4 hrs, the aqueous solution was cooled to room temperature and adjusted to pH 6-7 with 3 mol/L of a NaOH solution, and the aqueous solution was adjusted to have a solid content of 20%. In this manner, a betaine-type polycarboxylate superplasticizer of MPEG-DMPAS-AA-1 was obtained. Following the test method in National Standard GB 8077-2000, the superplasticizer was tested to have a cement paste fluidity of 265 mm.

EXAMPLE 2

10 g of methyl allyl polyoxyethylene ether with a molecular weight of 2000 (MPEG2000), and 4 g of N,N-dimethyl-N-methacrylamidopropyl-N-propanesulfonate (DMHAS)

were fed to a reaction vessel containing 100 g of distilled water, heated, and stirred to uniformity. Then, 5 g of methacrylic acid (MA) was added. When the temperature of the water bath was raised to 75° C. while stirring, a first 0.06 g of ammonium persulfate was added, and reacted for 1 h; then an additional 0.06 g of ammonium persulfate was added, and reacted for another 1 h; and subsequently, a last 0.06 g of ammonium persulfate was added. After reaction with thermal insulation for 4 hrs, the aqueous solution was cooled to room temperature and adjusted to pH6-7 with 3 mol/L of a NaOH solution, and the aqueous solution was adjusted to have a solid content of 25%. In this manner, a betaine-type polycarboxylate superplasticizer of MPEG-DMHAS-MA-2 was obtained. Following the test method in National Standard GB 8077-2000, the superplasticizer was tested to have a cement paste fluidity of 245 mm.

EXAMPLE 3

10 g of allyl polyoxyethylene ether with a molecular weight of 1000(TPEG1000), and 4 g of N,N-dimethyl (methacryloyloxyethyl)ammonium propanesulfonate (DM-PAS) were fed to a reaction vessel containing 100 g of distilled water, heated, and stirred to uniformity. Then, 5 g of methacrylic acid (MA) was added. When the temperature of the water bath was raised to 75° C. while stirring, a first 0.07 g of ammonium persulfate was added, and reacted for 1 h; then an additional 0.07 g of ammonium persulfate was added, and reacted for another 1 h; and subsequently, a last 0.07 g of ammonium persulfate was added. After reaction with thermal insulation for 4 hrs, the aqueous solution was cooled to room temperature and adjusted to pH6-7 with 3 mol/L of a NaOH solution, and the aqueous solution was adjusted to have a solid content of 15%. In this manner, a betaine-type polycarboxylate superplasticizer of TPEG-DMPAS-MA-3 was obtained. Following the test method in National Standard GB 8077-2000, the superplasticizer was tested to have a cement paste fluidity of 295 mm.

EXAMPLE 4

10 g of allyl polyoxyethylene ether with a molecular weight of 2000 (TPEG2000) and 6 g of N,N-dimethyl-N-methacrylamidopropyl-N-propanesulfonate (DMHAS) were fed to a reaction vessel containing 100 g of distilled water, heated, and stirred to uniformity. Then, 5 g of methacrylic acid (MA) was added. When the temperature of the water bath was raised to 75° C. while stirring, a first 0.08 g of ammonium persulfate was added, and reacted for 1 h; then an additional 0.08 g of ammonium persulfate was added, and reacted for another 1 h; and subsequently, a last 0.08 g of ammonium persulfate was added. After reaction with thermal insulation for 4 hrs, the aqueous solution was cooled to room temperature and adjusted to pH6-7 with 3 mol/L of a NaOH solution, and the aqueous solution was adjusted to have a solid content of 30%. In this manner, a betaine-type polycarboxylate superplasticizer of TPEG-DMHAS-MA-4 was obtained. Following the test method in National Standard GB 8077-2000, the superplasticizer was tested to have a cement paste fluidity of 305 mm.

EXAMPLE 5

10 g of allyl polyoxyethylene ether with a molecular weight of 3000(TPEG3000), and 8 g of N,N-dimethyl (methacryloyloxyethyl)ammonium propanesulfonate (DM-PAS) were fed to a reaction vessel containing 100 g of distilled water, heated, and stirred to uniformity. Then, 5 g of acrylic acid (AA) was added. When the temperature of the water bath was raised to 75° C. while stirring, a first 0.09 g of ammonium persulfate was added, and reacted for 1 h; then an additional 0.09 g of ammonium persulfate was added, and reacted for another 1 h; and subsequently, a last 0.09 g of ammonium persulfate was added. After reaction with thermal insulation for 4 hrs, the aqueous solution was cooled to room temperature and adjusted to pH6-7 with 3 mol/L of a NaOH solution, and the aqueous solution was adjusted to have a solid content of 20%. In this manner, a betaine-type polycarboxylate superplasticizer of TPEG-DMPAS-AA-5 was obtained. Following the test method in National Standard GB 8077-2000, the superplasticizer was tested to have a cement paste fluidity of 270 mm.

The forgoing description merely gives preferred examples of the present invention, and is not intended to limit the present invention. Any modifications, equivalent replacements and variations made without departing from the spirit and principle of the present invention are embraced in the protection scope of the present invention.

What is claimed is:
1. A superplasticizer for concrete, wherein the superplasticizer is obtained through aqueous solution polymerization of a monomer A, a monomer B and a monomer C at a weight ratio of (1-30%):(20-50%):(20-50%) in the presence of an initiator;
wherein the monomer A has a general formula of

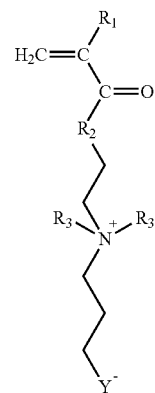

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;
the monomer B has a general formula of

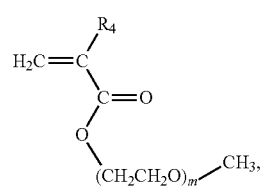

in which $R_4$ is H or $CH_3$, and m is the average addition moles of oxyethylene and is an integer selected from 1 to 100; and
the monomer C has a general formula of

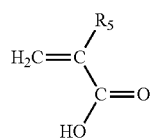

in which $R_5$ is H or $CH_3$.

2. A method for preparing a the superplasticizer for concrete according to claim 1, comprising:
   placing a monomer A and a monomer B in a reaction vessel, adding water, and stirring;
   then adding a monomer C to the reaction vessel, stirring, and adding water to adjust in such a manner that the total weight of the monomers accounts for 10-20% of the total weight of the aqueous solution, in which the weight ratio of the monomer A, the monomer B, and the monomer C is (1-30%):(20-50%):(20-50%);
   under an inert atmosphere, adding an initiator when the temperature is raised to 60-100° C.; and
   reacting for 4-6 hrs with thermal insulation, and after the reaction is complete, adjusting the pH to 5-7, to obtain an aqueous solution of the superplasticizer;
   wherein the monomer A has a general formula of

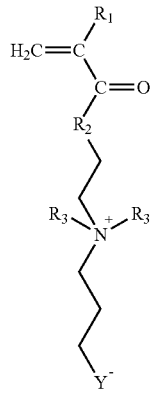

in which $R_1$ is H or $CH_3$, $R_2$ is O or NH, $R_3$ is any one of $CH_3$, $CH_2CH_3$, and $CH_2CH_2CH_3$, and Y is any one of COO, $SO_3$, and $PO_3$;

the monomer B has a general formula of

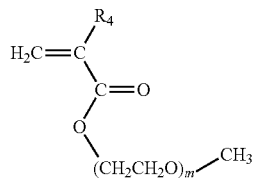

in which $R_4$ is H or $CH_3$, m is the average addition moles of oxyethylene, and is an integer selected from 1 to 100; and the monomer C has a general formula of

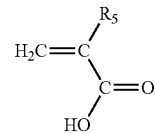

in which $R_5$ is H or $CH_3$.

3. The method for preparing a the superplasticizer for concrete according to claim 2, wherein the initiator is a water soluble free radical initiator, and has a total amount accounting for 0.5-2.0% of the total weight of the monomers.

4. The method for preparing a the superplasticizer for concrete according to claim 2, wherein the initiator is at least one of ammonium persulfate, potassium persulfate, or a redox initiator.

5. The method for preparing a the superplasticizer for concrete according to claim 2, wherein the initiator is formulated into an aqueous solution before addition, and is added in a manner such that ⅓ of the total weight of the aqueous initiator solution is added dropwise per hour.

6. The method for preparing a the superplasticizer for concrete according to claim 2, wherein the adjusting of the pH to 5-7 is achieved by adding 1-3 mol/L of a basic aqueous NaOH solution.

7. The method for preparing a the superplasticizer for concrete according to claim 2, wherein the water is deionized water.

* * * * *